United States Patent [19]

Coleman

[11] Patent Number: 4,714,978
[45] Date of Patent: Dec. 22, 1987

[54] POWER SUPPLY FOR A.C. COROTRONS

[75] Inventor: James A. Coleman, Webster, N.Y.

[73] Assignee: Xerox Corporation, Stamford, Conn.

[21] Appl. No.: 853,251

[22] Filed: Apr. 17, 1986

[51] Int. Cl.$^4$ ............................................. E03G 15/00
[52] U.S. Cl. ................................. 361/235; 355/3 CH
[58] Field of Search ............... 361/229, 230, 235, 91;
355/3 CH, 14 CH; 250/324-326; 330/251;
363/97, 21

[56] References Cited

U.S. PATENT DOCUMENTS

| | | | |
|---|---|---|---|
| 4,004,209 | 1/1977 | Lawson, Jr. | 321/2 |
| 4,210,858 | 7/1980 | Ford et al. | 361/235 X |
| 4,234,249 | 11/1980 | Weikel, Jr. et al. | 355/3 CH |
| 4,281,374 | 7/1981 | Archer | 363/97 X |
| 4,484,812 | 11/1984 | Takayanagi | 250/324 X |
| 4,516,848 | 5/1985 | Moriya | 355/3 CH |
| 4,602,308 | 7/1986 | Montague | 361/91 |
| 4,628,426 | 12/1986 | Steigerwald | 363/21 X |

FOREIGN PATENT DOCUMENTS 68356  4/1985  Japan ................................ 250/326

OTHER PUBLICATIONS

Texas Instruments Spec. Sheets on "Regulating Pulse Width Modulators", pp. 6-69, 6-74, 6-75 (1982).

*Primary Examiner*—L. T. Hix
*Assistant Examiner*—D. Rutledge
*Attorney, Agent, or Firm*—Frederick E. McMullen

[57] ABSTRACT

A circuit for supplying power to the a.c. corotrons of copying or printing machines using a high leakage inductance type transformer both as a power transformer and as a low pass filter; a d.c. power source coupled to the transformer primary winding center tap; a push-pull amplifier having a MOSFET gate pair controlling energization of the transformer primary winding halves by the d.c. power source; a pulse width modulator for supplying alternating signal pulses to the MOSFET pair at a fixed frequency; a voltage doubler network for monitoring corotron current, the modulator adjusting the pulse width of the signal pulses in response to the network control signal to thereby adjust the power output of the circuit and maintain a constant corotron current; and a capacitor at the transformer output cooperable with the transformer to form said low pass filter.

6 Claims, 4 Drawing Figures

POWER SUPPLY FOR A.C. COROTRONS

The invention relates to a corotron power supply circuit, and more particularly, to an improved constant current a.c. corotron power supply circuit.

In xerographic type copying or printing machines, there are typically several corona discharge devices, commonly known as corotrons. While the type, use, and disposition of these corotrons may take various forms, typically at least one corotron is an a.c. type corotron and as such requires an a.c. power supply. Since copy quality and the continued and efficient operation of the copying or printing machine is directly dependent upon the proper operation and functioning of the corotrons, the corotron power supply must not only be extremely reliable but also be able to provide over prolonged periods and under differing machine operating conditions a continuous power output level. In this context, it is usually desirable that the corotron operating current remain at a constant level; this despite changes in the machine components due to aging, temperature conditions, dirt, etc. Thus, the power supply circuit should be able to respond to changes in corotron currents when they occur by changing or adjusting the a.c. power supply output so that a constant corotron current is maintained. Another important and necessary requirement for a.c. corotron power supplies is that the output be filtered; this to assure a uniform and smooth alternating current waveform with sharp cutoffs and changes.

While the above operating features of an a.c. corotron power supply are highly desirable and in some cases essential, features of this type usually add to the cost and complexity of the power supply circuit. These take the form of added circuit parts and components which raises circuit cost and makes the circuit more difficult to fabricate, install, and service.

The present invention addresses these needs while providing a relatively simple and inexpensive power supply circuit for a.c. corotrons, the circuit including a pulse width modulator which provides alternate drive signals of adjustable pulse width at a constant frequency; a transformer; a switch pair for separably connecting a common d.c. power source to the transformer primary winding in response to the drive signals from the modulator to induce an a.c. output in the transformer secondary winding; means for coupling the transformer secondary winding to the corotron; means for producing a control signal representative of corotron current, the modulator adjusting the pulse width of the drive signals in response to the control signal to thereby change the transformer a.c. output and maintain corotron current constant; and filter means for filtering the transformer a.c. power output so that the a.c. output to the corotron has a substantially sinusoidal waveshape, the filter means including the transformer.

IN THE DRAWINGS

Figure 1:
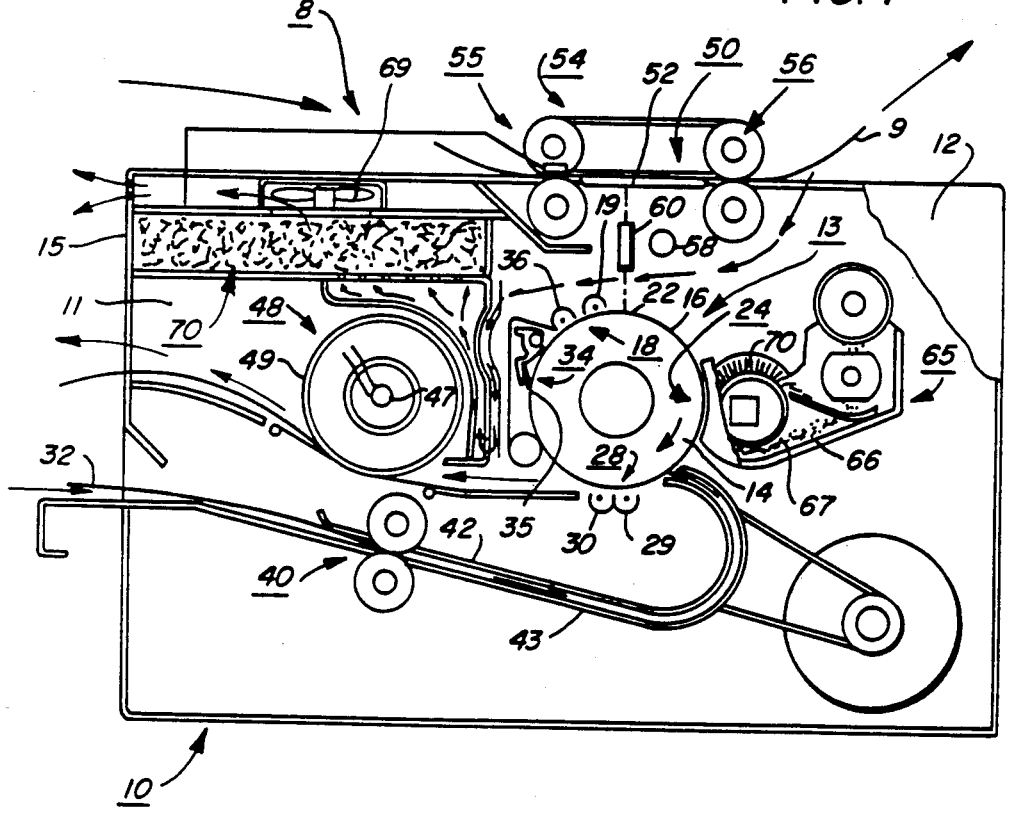
FIG. 1 is a side view in section of a copying/printing machine with a.c. type detack and pre-charge corotrons.

Referring to FIG. 1 of the drawings, there is shown a xerographic type reproduction machine 8 incorporating the present invention. Machine 8 has a suitable frame or housing 10 with sides 11, 12 within which the machine xerographic section 13 is operatively supported. Briefly, and as will be familiar to those skilled in the art, the machine xerographic section 13 includes a recording member, shown here in the form of a rotatable photoreceptor 14. In the exemplary arrangement shown, photoreceptor 14 comprises a drum having a photoconductive surface 16. Other photoreceptor types such as belt, web, etc. may instead be contemplated. Operatively disposed about the periphery of photoreceptor 14 are charge station 18 with charge corotron 19 for placing a uniform charge on the photoconductive surface 16 of photoreceptor 14, exposure station 22 where the previously charged photoconductive surface 16 is exposed to image rays of the document 9 being copied or reproduced, development station 24 where the latent electrostatic image created on photoconductive surface 16 is developed by toner, transfer station 28 with transfer and detack corotrons 29, 30 respectively for transferring the developed image to a suitable copy substrate material such as a copy sheet 32 brought forward in timed relation with the developed image on photoconductive surface 16, and cleaning station 34 with cleaning blade 35 and pre-charge corotron 36 for removing leftover developer from photoconductive surface 16 and neutralizing residual charges thereon.

Copy sheets 32 are brought forward to transfer station 28 by feed roll pair 40, sheet guides 42, 43 serving to guide the sheet through an approximately 180° turn prior to transfer station 28. Following transfer, the sheet 28 is carried forward to a fusing section 48 where the toner image is fixed by fusing roll 49. Fusing roll 49 is heated by a suitable heater such as lamp 47 disposed within the interior of roll 49. After fixing, the copy sheet 28 is discharged.

A transparent platen 50 supports the document 9 as the document is moved past a scan point 52 by a constant velocity type transport 54. As will be understood, scan point 52 is in effect a scan line extending across the width of platen 50 at a desired point along platen 50 where the document is scanned line by line as the document is moved along platen 50 by transport 54. Transport 54 has input and output document feed roll pairs 55, 56 respectively on each side of scan point 52 for moving document 9 across platen 50 at a predetermined speed. Exposure lamp 58 is provided to illuminate a strip-like area of platen 50 at scan point 52. The image rays from the document line scanned are transmitted by a gradient index fiber lens array 60 to exposure station 22 to expose the photoconductive surface 16 of the moving photoreceptor 14.

Developing station 24 includes a developer housing 65, the lower part of which forms a sump 66 for holding a quantity of developer 67. As will be understood by those skilled in the art, developer 67 comprises a mixture of larger carrier particles and smaller toner or ink particles. A rotatable magnetic brush developer roll 68 is disposed in predetermined operative relation to the photoconductive surface 16 in developer housing 65, roll 68 serving to bring developer from sump 66 into developing relation with photoreceptor 14 to develop the latent electrostatic images formed on the photoconductive surface 16.

Figure 2:
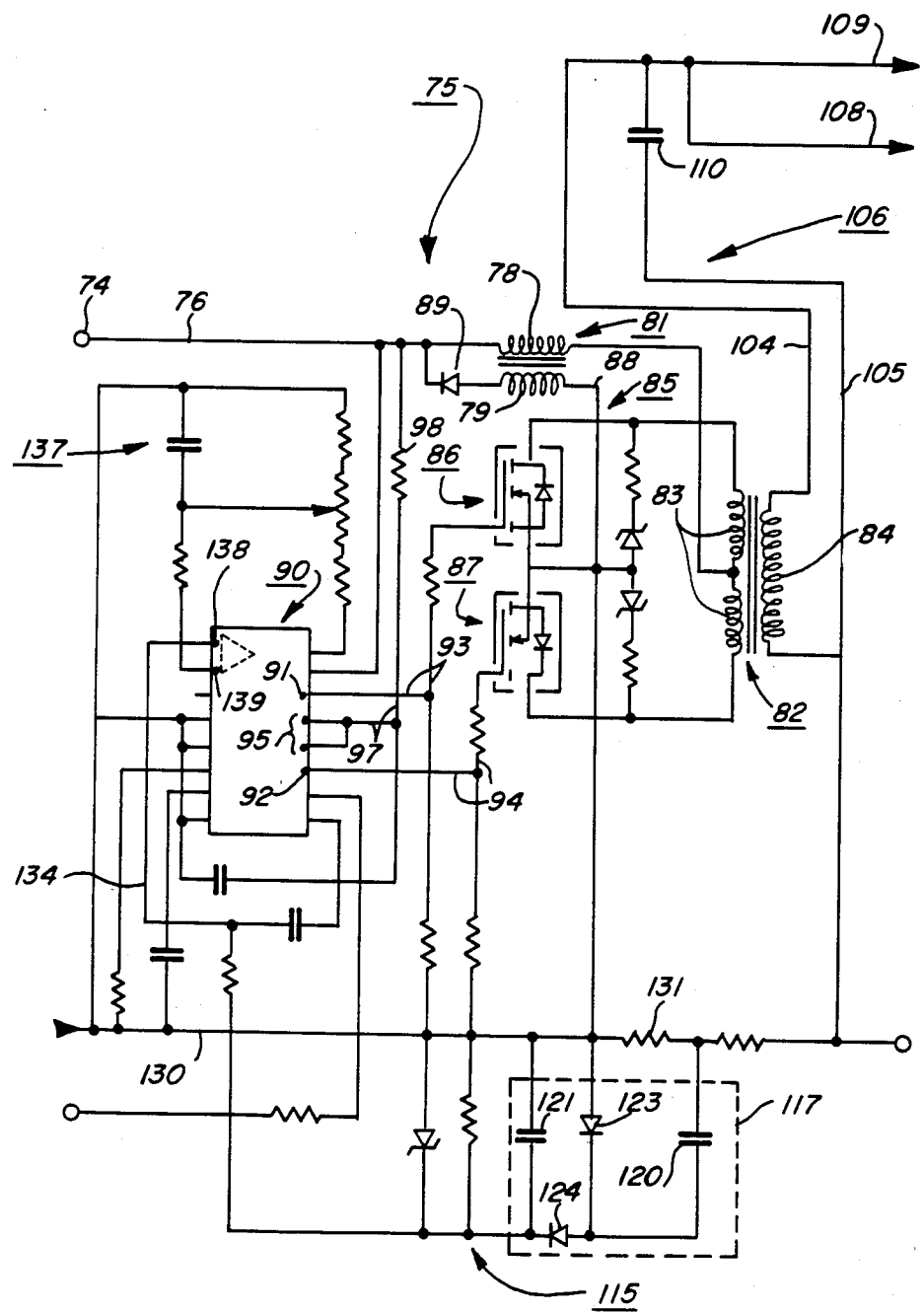
FIG. 2 is a circuit schematic showing details of the a.c. power supply circuit of the present invention.
Figure 3:
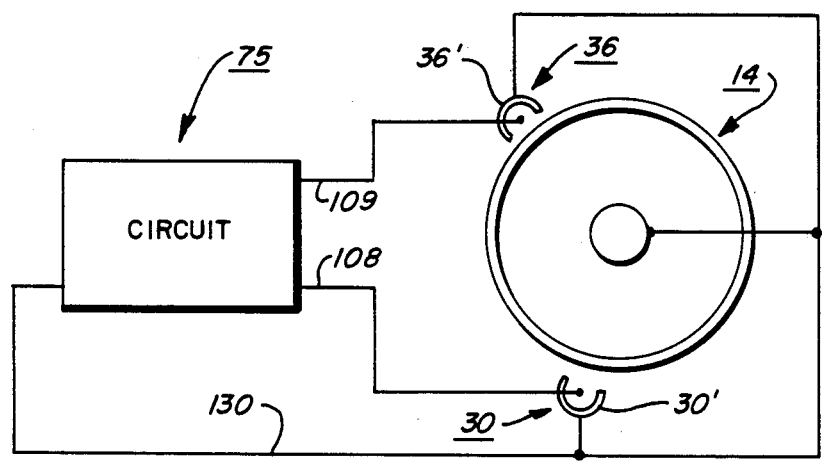
FIG. 3, is a schematic view illustrating detack and pre-charge corotron current feedback to the power supply circuit shown in FIG. 2.
Figure 4:
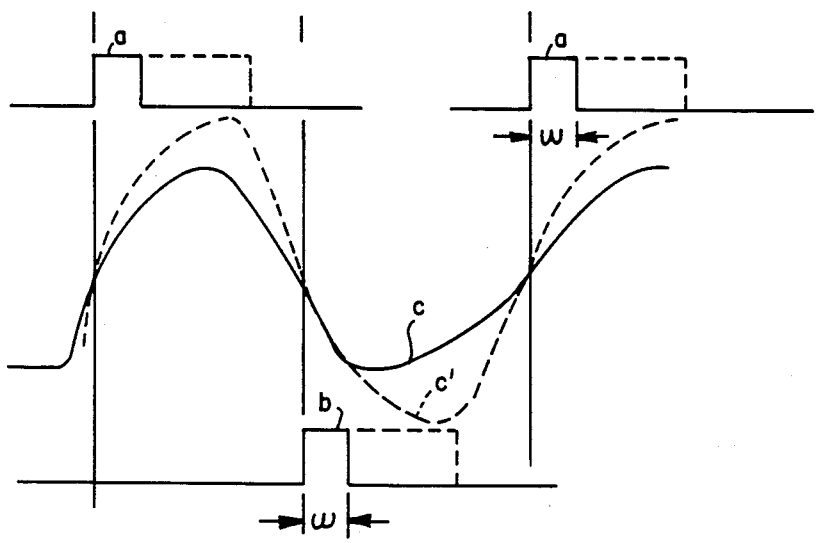
FIG. 4 is a graph showing typical signal input pulse and the power supply output waveforms and the timing relationship therebetween.

In the aforedescribed machine, detack and pre-charge corotrons 30, 36 respectively are a.c. type corotrons. To provide the requisite a.c. power for operating corotrons 30, 36, the a.c. power supply circuit of the present invention, designated generally by the numeral 75, is provided. Referring particularly to FIGS. 2, 3, and 4 of the drawings, power supply circuit 75 has an input line 76 coupled to a suitable relatively low voltage d.c. power source such as a 24 v. power supply 74. Line 76 is in turn connected through one winding 78 of a bifilar toroid 81 to the center tap of the primary winding 83 of a transformer 82. The primary winding 83 of transformer 82 is connected across a pair of power switches, shown here as MOSFETS 86, 87 of a push/pull class D amplifier 85. Winding 78 serves to control and limit current through winding 83 of transformer 82. A return loop 88 through the second winding 79 of toroid 81 and a diode 89 to power supply line 76 provides the means to return the flux in the toroid core to zero for the start of the next half cycle.

On-off operation of MOSFETS 86, 87 is controlled by a pulse width modulator in the form of a chip 90. Chip 90 may comprise any suitable pulse width modulator such as a Texas Instruments Model NO. SG 3524 Regulating Pulse Width Modulator. The emitter outputs 91, 92 of chip 90 are coupled to the control gates of MOSFETS 86, 87 by lines 93, 94 respectively while the collectors 95 of chip 90 are connected by line 97 through resistor 98 to the power supply input line 76. As depicted in FIG. 4, emit gates 91, 92 of chip 90 output alternating square wave signal pulses a, b of constant frequency to MOSFETS 86, 87 of amplifier 85. The alternating pulse input to the primary winding 83 of transformer 82 that results from the push/pull action of MOSFETS 86, 87 induces a sine wave (a.c.) signal output in the secondary winding 84 of transformer 82. Secondary winding 84 of transformer 82 is connected by line 104 to leads 108, 109 of detack and pre-charge corotrons 30, 36 respectively.

To filter and smooth the a.c. signal output of transformer 82, a low pass filter 106 is provided. Filter 106 comprises a high voltage capacitor 110 in line 105 and transformer 82 itself. For this purpose, transformer 82 is designed as a relatively low efficiency high leakage inductance transformer. Normally, as will be understood, transformers of this type, because of their low efficiency, would not be used in this type of application. However, by using a transformer with high leakage inductance, the transformer itself provides the inductance necessary to form, in cooperation with capacitor 110, an effective low pass filter for filtering and smoothing the a.c. signal output of transformer 82 to corotrons 30, 36 shown at c in FIG. 4. By this construction, the need for a separate filter coil is avoided, simplifying circuit 75 and reducing the number of circuit parts.

To assure a substantially constant current output to detack and pre-charge corotrons 30, 36 respectively, the operating current of corotrons 30, 36 is monitored using a feedback loop 115. Where a change in corotron current occurs, the control signal output by feedback loop 115 to chip 90 causes a change in the pulse width (w) of the signal pulses a and b from chip emitter outputs 91, 92 to MOSFETS 86, 87 of amplifier 85.

Feed back loop 115 employs a voltage doubler network 117 consisting of capacitors 120, 121 and diodes 123 and 124 for sensing corotron current in current return line 130. As seen in FIG. 3, return line 130 is connected to the shields 30', 36' of detack and pre-charge corotrons 30, 36 respectively and the common ground of photoreceptor 14. A resistor 131 is provided for converting the total a.c. return corotron current to an a.c. voltage signal input to network 117. Network 117 provides a d.c. control potential which is input through line 134 to the negative chip output adjusting amplifier 138. A chip output adjusting circuit 137 is provided for setting the power output of circuit 75, circuit 137 being connected to the positive chip output adjusting amplifier 139. Chip 90 includes a suitable comparator circuit (depicted in FIG. 2 by dotted lines) which compares the signal at chip output adjusting gates 138, 139, and in response adjusts the pulse width w of the signal pulses a, b output by emitter outputs 91, 92 to MOSFETS 86, 87. This in turn changes the peak level of the signal output wave c shown in FIG. 4 as for example shown by dotted lines at c' to maintain corotron current substantially constant. The frequency of the signal output c of circuit 75 however remains constant.

While power supply circuit is shown and described as providing power to a pair of corotrons 30, 36, it will be understood that circuit 75 may be used to supply power to any number of corotrons ranging from one to several.

While the invention has been described with reference to the structure disclosed, it is not confined to the details set forth, but is intended to cover such modifications or changes as may come within the scope of the following claims.

I claim:

1. An a.c. power supply circuit for a corona discharge device of a xerographic type copying or printing machine, comprising:
    (a) a pulse width modulator providing alternating drive signals of adjustable pulse width at a predetermined fixed frequency;
    (b) an output transformer having primary and secondary windings;
    (c) push-pull amplifier means for applying power to said transformer primary winding in response to said drive signals to operate said transformer whereby said transformer secondary winding generates an a.c. power output;
    (d) an output line coupling said transformer secondary winding with said corona device;
    (e) sensing means for sensing current in said corona device and providing a control signal representative thereof to said modulator,
    said modulator adjusting the pulse width of said drive signals in response to said control signal to thereby adjust the a.c. power output of said transformer and maintain current in said corona device substantially constant, and
    (f) filter means for filtering said transformer a.c. power output so as to provide a substantially uniform sinusoidal a.c. power output to said corona device,
    said filter means including said transformer.

2. The circuit according to claim 1 in which said transformer comprises a high leakage inductance transformer.

3. The circuit according to claim 2 in which said filter means includes capacitor means in said connecting means cooperable with said secondary winding of said high leakage inductance transformer to provide a low pass filter for filtering said transformer a.c. power output.

4. The circuit according to claim 3 in which said current sensing means includes
   a return line connecting said corona discharge device with said circuit,
   a voltage doubler network for sensing current levels in said return line to provide said control signal, and
   means for inputting said control signal to a control input of said modulator.

5. The circuit according to claim 4 in which said transformer primary winding is provided with a center tap,
   a d.c. power source for said circuit, and
   current controlling means having first and second windings, said first winding connecting said d.c. power source with said center tap, and a return loop with said second winding and diode means, said second winding and said diode means cooperating to reduce flux in said first winding to substantially zero prior to application of power to said transformer primary winding;
   said amplifier means having first and second switches for selectively completing a circuit from said d.c. power source through one or the other sides of said transformer primary winding; and
   a first connector for inputting one of said drive signals from said modulator to said amplifier means first switch; and
   a second connector for inputting the other of said drive signals from said modulator to said amplifier means second switch.

6. A power supply circuit for providing substantially constant current a.c. power to a corona discharge device in a xerographic type copying or printing machine, comprising:
   (a) pulse generating means providing a succession of alternating first and second signal pulses at a fixed frequency;
   (b) a power transformer having primary and secondary windings, said primary winding being center tapped;
   (c) a first control gate responsive to said first signal pulses for coupling a first half of said transformer primary winding with a d.c. power source;
   (d) a second control gate responsive to said second signal pulses for coupling a second half of said transformer primary winding with said d.c. power source;
   (e) a first line for transmitting said pulse generating means first signal pulses to said first control gate;
   (f) a second line for transmitting said pulse generating means second signal pulses to said second control gate;
   (g) current controlling means between said center tap and said d.c. power source for limiting current through said transformer primary winding;
   said first and second signal pulses actuating said first and second control gates so that said transformer primary winding first and second halves are alternately energized and said transformer secondary winding produces an alternating current output;
   said transformer comprising a relatively low efficiency high leakage inductance transformer;
   (h) low pass filter means for filtering the alternating current output of said transformer, said filter means including capacitance means cooperable with said transformer secondary winding to form said filter; and
   (i) connector means for transmitting the filtered alternating current output to said device.

* * * * *